Jan. 22, 1957     W. MOORE, JR., ET AL     2,778,574

OSCILLATING CONTROL APPARATUS

Filed June 11, 1952

*INVENTORS.*
WARREN MOORE JR.
ROBERT J. EHRET
BY Arthur H. Swanson
ATTORNEY.

United States Patent Office 2,778,574
Patented Jan. 22, 1957

2,778,574

OSCILLATING CONTROL APPARATUS

Warren Moore, Jr., and Robert J. Ehret, Philadelphia, Pa., assignors to Minneapolis-Honeywell Regulator Company, Minneapolis, Minn., a corporation of Delaware Application June 11, 1952, Serial No. 292,908

11 Claims. (Cl. 236—78)

The general object of the present invention is to provide an improved oscillator control apparatus of the type wherein the oscillating conditions of an oscillator may be remotely controlled and controlled in accordance with the deviation of some control variable from its preselected control point. More specifically, the present invention is concerned with a control apparatus of the type wherein the variations of a controlled variable cause a vane to be moved into and out of a controlling relation with respect to a pair of coils in an oscillator circuit; with the specific improvement lying in the provision of adjusting the critical point at which the oscillator will go into and out of oscillation.

In the co-pending application of Warren Moore, Jr., Serial Number 106,796, filed July 26, 1949, now Patent No. 2,647,252, there is disclosed a vane controlled oscillator wherein a condition or variable controlled vane goes in and out of the proximity of a pair of coils to cause an oscillator to go into and out of oscillation. This circuit configuration gives a highly sensitive and accurate control of the oscillator circuit and causes it to produce "on" and "off" operation of a control relay.

In said Moore Patent, the circuit is arranged to cause actuation of a control relay when an inductance has reached a certain critical value. In this present invention, the circuit has been modified so that this critical value can be changed by an electrical signal. The moore patent circuit is characterized by having "snap action" when passing between a state of oscillation and no oscillation. It was found desirable in the present application to retain this snap action as well as other desirable features of the Moore circuit and yet be able to shift the critical point at which the oscillator goes into and out of oscillation. It is further desired to obtain this shift by an electrical signal as contrasted from making a physical change in the value of certain components in the oscillator circuit. In certain types of automatic control circuits a straight "on" and "off" type of control may cause a hunting condition of the controlled variable. Such hunting conditions can be eliminated by causing the ratio of on time to off time of the control relay to vary in accordance with the deviation of the controlled variable from set point. When the controlled variable deviates from the control point by more than a predetermined amount, then it is desirable that the control relay remain in the actuated position until the variable is brought back into a predetermined range about the set point.

It is therefore an object of the present invention to provide a new and improved vane controlled oscillator wherein a vane which is adjustable in accordance with the magnitude of a controlled variable is moved relative to a pair of coils in a resonant circuit of an oscillator and wherein the coupling of a resonant circuit to an electronic driving device for said oscillator is variable.

Another object of the present invention is to provide for the changing of the set point of an oscillator by means of a voltage or elastic signal without affecting the operating characteristics of the oscillator.

Still another object of the present invention is to provide an electronic control apparatus including an oscillator circuit having a variable inductive element common to two resonant circuits in said oscillator and having a variable attenuator or coupling between said inductive element and the input of an electronic device which drives the oscillator.

Another object of the present invention is to provide a new and improved variable controlled vane type oscillator wherein a cathode follower coupled between the resonant circuit of the oscillator and the input of an electronic driving device is controlled by a cathode follower having adjustable biasing means therefor.

Still another object of the present invention is to provide for the remotely controlling of the set point of a snap acting oscillator.

A still further object of the present invention is to provide a new and improved oscillator control circuit wherein the coupling between a resonant circuit in said oscillator and an electronic driving device for said oscillator is cyclically varied.

Another object of the present invention is to provide a new and improved vane controlled oscillator circuit wherein time-cycling operation of the oscillator will be effected when a controlled variable deviates from a preselected control point.

The various features of novelty which characterize our invention are pointed out with particularity in the claims annexed hereto and forming a part of the specification. For a better understanding of the invention, however, its advantages, and specific objects attained with its use, reference should be had to the accompanying drawings and descriptive matter in which we have illustrated and described preferred embodiments of the invention.

Figure 1:
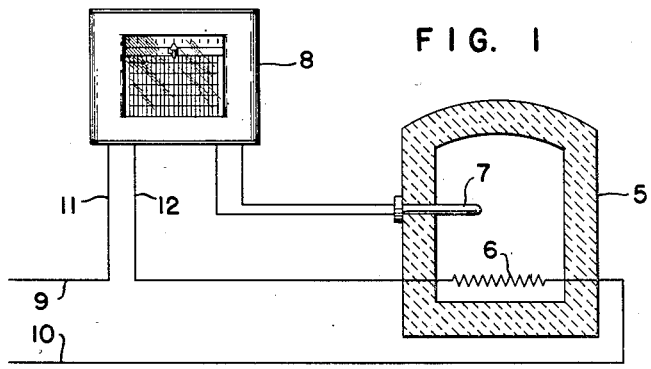
Figure 1 is a schematic showing of how the present invention might be applied to a particular control problem.

Referring now to Figure 1, the numeral 5 represents an electric furnace having therein an electrical heater 6, said heater supplying heat to the furnace 5 in the usual manner. A temperature measuring element 7 which may be in the form of a thermocouple or temperature sensitive resistance has one portion thereof projecting within a furnace 5 so as to be exposed to the temperature therein. The output of this temperature sensitive element is sent through a suitable electrical indicating and controlling apparatus indicated by the numeral 8. The controlling apparatus 8 is uilized to control the energization of the heater 6 by connecting the heater 6 by suitable switching means, not shown in this figure, to input power lines 9 and 10 by way of conductors 11 and 12.

The instrument 8 is arranged to sense the magnitude of the controlled variable or temperature in the furnace 5 and to effeffct energization of the heater 6 whenever the controlled variable deviates from the desired value.

Figure 2:
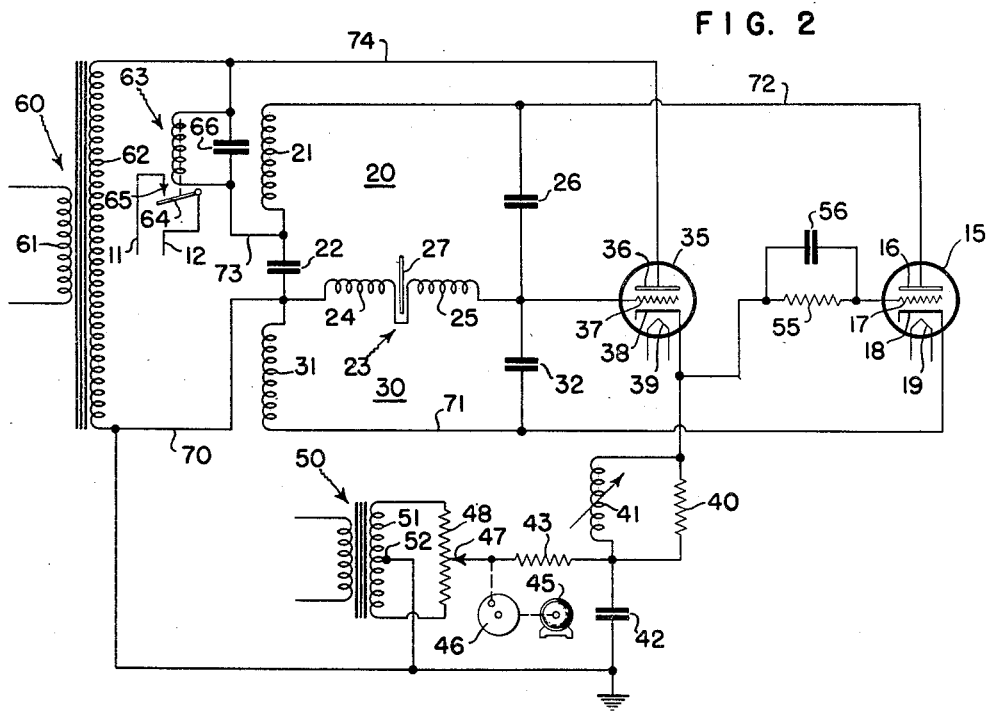
Figure 2 is a diagrammatic circuit showing the present invention.

Referring now to Figure 2, there is shown one form that the electrical circuit of the present invention may assume. The heart of the circuit shown in Figure 2 is an oscillator having an electronic device 15 acting as a driving element for the oscillator. This device is shown as a triode having an anode 16, a control electrode 17, and a cathode 18, the latter of which is arranged to be heated to be electron emissive by a suitable heater 19. The anode 16 of the device 15 is arranged to be coupled to an output resonant circuit 20 which includes an inductive element 21, a capacitive element 22, a variable inductive element 23 including a pair of coils 24 and 25 and a condenser 26. The coupling between the coils 24 and 25 of the variable inductive element 23 may be varied by a suitable vane which may be formed of aluminum or other like highly conductive material. The positioning of the vane 27 may be accomplished in any desired manner in accordance with variations of the temperature of the temperature sensing element 7, shown in Figure 1. This is conventionally done by a suitable galvanometer movement as is shown in the above mentioned Moore patent.

The input resonant circuit for the discharge device 15 is indicated generally at 30 and includes the variable inductive element 23, which functions as a variable feedback coupling, as well as the inductive element 31 and condenser 32. This resonant input circuit 30, for the tube 15, is coupled to the tube 15 by way of a cathode follower circuit which includes an electronic device 35 having an anode 36, control electrode 37, and a cathode 38, the latter of which is heated to be electron emissive by a suitable heater 39. Connected to the cathode 38 is a cathode load resistor 40 as is a variable inductive element 41, the latter of which is utilized to balance the cathode-heater capacity. A condenser 42 is connected between the variable inductive element 41 and a ground connection. A resistor 43 acts as a D. C. bias resistor in the circuit of cathode 38.

For remotely varying the bias of the cathode 38 there is provided a motor 45 which may drive a suitable eccentric 46 which is arranged to move a slider 47 over a suitable slide wire 48. The ends of the slide wire 48 are energized by a suitable source of power 50 having a secondary 51 connected to the ends of the slide wire 48 and having a center tap at 52, the latter of which is connected to ground.

The control electrode 17 of the electronic device 15 is coupled to the cathode 38 of the device 35 by a resistor 55 which has a condenser 56 connected in parallel therewith.

The power supply for the circuit is a transformer 60 having a primary winding 61 and a secondary winding 62. Connected between the anode 16 of the device 15 and the secondary 62 is a suitable control relay 63 having a switch blade 64 normally held out of engagement with an associated contact 65 whenever the current flow through the relay winding is below a predetermined value. The relay winding is bypassed by a suitable bypass condenser 66.

In considering the operation of the circuit in Figure 2, let it first be assumed that the motor 45 is not energized so that the voltage of the cathode 38 of tube 35 is at a fixed value. Let it also be assumed that the vane 27 is positioned between the coils 24 and 25 so as to minimize the coupling therebetween. With coils 24 and 25 having the vane 27 therebetween, the variable element 23 acts as a low impedance and reduces the coupling between the output resonant circuit 20 and the input resonant circuit 30. As long as this coupling between the input and output circuits is below a certain critical value, at which oscillation will occur, and the attenuation through the cathode follower circuit is of a predetermined value, there will be no oscillation in the circuit.

When there is no oscillation present in the circuit, the tube 15 will draw a relatively large amount of current. The electron current flow for the tube 15 may be traced from the lower terminal of the secondary 62 through the conductors 70, inductive element 31, conductor 71, cathode 18, anode 16, conductor 72, inductive element 21, conductor 73, the relay winding of relay 63, and conductor 74 back to the upper terminal of the secondary 62. Since there is an appreciable amount of current flowing in this circuit which includes the relay winding of the relay 63, the relay 63 will move to an actuated position wherein the blade 64 will engage contact 65. When the blade 64 engages contact 65, an electrical circuit will be completed from the conductor 11 to the conductor 12 so that, referring to Figure 1, the electrical circuit to the heater 6 will be completed and the heater 6 will supply heat to the furnace 5.

As soon as the heater 6 has heated the furnace 5 to the higher temperature, the temperature sensitive element 7 will be effective through the instrument 8 to cause the vane 27 to move away from its position in the coils 24 and 25. As soon as this occurs, the impedance of the inductive element will increase so that the coupling between the output resonant circuit 20 and the input resonant circuit 30 exceeds the critical value and the circuit will go into oscillation. This presumes the attenuation of the signal into the input of tube 15 is such that oscillation can be sustained. If the left end of the resistor 55 were directly connected to the right end of the coil 25, then the circuit would be substantially the same as disclosed in the above Moore patent. However, with the cathode follower circuit in this connection, there will be a predetermined attenuation of the signal and this will depend upon the gain of the cathode follower which can not exceed one. As a cathode follower has no appreciable phase shift, the regenerative signal will act as in the Moore application circuit, to sustain oscillation.

With the presence of an oscillating signal from the input resonant network 30, the control electrode 17 will be driven positive with respect to the cathode 18 and there will be a resultant grid current flow which will cause a voltage drop across the resistor 55 and establish a biasing potential on the condenser 56. The biasing potential on the condenser 56 will cause the control electrode 17 to be negative with respect to the cathode 18 and therefore to decrease the average current flowing through the device 15.

When the current flow through the tube 15 decreases, there will be a decrease in the current flow through the winding of the relay 63 and the relay will move from its actuated position so that the blade 64 will move out of engagement with contact 65 to break the conductive connection between the conductors 11 and 12 and de-energize the heater 6.

As soon as the furnace 5 has cooled sufficiently, the temperature responsive element 7 will again, acting through the instrument 8, cause the vane 27 to move between the vane coils 24 and 25 to interrupt the oscillations of the oscillator so as to once again cause actuation of the relay 63 and reenergization of the heater 6.

The ability of the oscillating circuit to oscillate is directly dependent upon two variable factors, firstly the amount of coupling between the coils 24 and 25 as regulated by the position of the vane 27 and secondly the variable coupling or attenuation between the resonant circuits and the input of the tube 15 as affected by the action of the cathode folower which includes the tube 35 and its associated elements. Since a cathode follower circuit is being used in the variable coupling between the resonant circuit and the input of the tube 15, the maximum coupling between the resonant circuit and the tube 15 will approach 100% but will never equal that value because of the fact that the cathode follower gain will not exceed one. It will thus be seen that the cathode follower including the tube 35 acts as a variable attenuator with no phase shift introduced between the resonant circuit and the input of tube 15. This variable attenuator will be varied from a value which approaches 0 to some higher value which will be dependent upon the characteristic of the tube 35 and the magnitude of the circuit elements associated therewith.

One way of changing the critical point of the oscillator is to vary the effective gain of the cathode follower, or vary its attenuation. This may be done by changing the biasing voltage applied thereto by the slide wire 48 and slider 47. As only a voltage change is necessary, it should be obvious that the variable voltage source may be remotely positioned and adjusted to change the set point of the oscillator.

In order to maintain the temperature of the furnace 5 effectively constant it has been found desirable to cyclically vary the attenuation or coupling between the oscillator circuit and the input of the electronic oscillator driving device 15. By cyclically varying the coupling, it has been found that a time proportional controlling action can be obtained with the time periods of energization of the heater 6 being proportional to the magnitude of the deviation of the variable from the set point of the apparatus. In other words, when the temperature in the furnace is at the set point, the heater 6 should be energized for a predetermined time which will maintain the temperature constant but when the temperature is a little off the control point, the heater 6 is cyclically energized for longer or shorter time periods of energization varying from 0 to 100% of each operating cycle depending upon the magnitude of the deviation and the direction of the deviation of the temperature from the set point.

Figure 3:
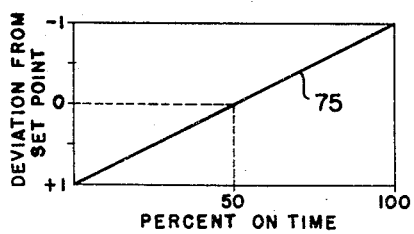
Figure 3 is a graphical representation of the manner in which the present invention operates when the control variable deviates within predetermined limits of the control point.

This will be seen by referring to Figure 3 wherein the percentage "on" time for the resistor 6 is plotted as the abscissa and the unit deviation from the set point has been ploted as the ordinate on a suitable graph. If the temperature of the furnace is exactly at the set point, the deviation on the graph will be zero. This means that with zero devication, the percent "on" time will be 50 percent. If the temperature drops below the set point by one unit, indicated by a minus one on the graph, the percent "on" time will be 100. If the temperature goes over the set point by more than one unit, indicated by a plus 1, the percent "on" time will be zero. This arrangement thus causes the furnace temperature to remain substantially constant at the set point of the apparatus. It will be obivous that the ability to obtain a balance at 50 percent "on" time when at the set point will depend on the size of the heater 6 and the rate of heat loss from the furnace 5, as well as other factors.

Referring back to Figure 2, when there is one fixed valve of coupling through the tube 35, the movement of the vane 27 into and out of the coils 24 and 25 will cause the oscillator to go into and out of oscillation at a fixed point in the position of the vane 27 with respect to the coils. However, when the coupling or attenuation through the tube 35 is changed to a different value, the point at which the vane 27 will cause the coils 24 and 25 to effect oscillation will also be varied. It will thus be seen that if the vane 27 remains in a relatively fixed position with respect to the coils 24 and 25, said position being near the point of oscillation of the oscillator, that variations in the coupling to the input of the tube 15 may be made to cause the oscillator to go into and out of oscillations. To effect this cyclic operation, the motor 45 is put into operation so that it will drive the eccentric 46 and theretofore move the slider 47 in a cyclic manner across the slide wire 48. The movement of the slider 47 on the slide wire 48 will cause a cyclic variation of the bias on the tube 35 and this variation of bias will cause the coupling or attenuation of the tube 35 to be varied and the oscillator will go into and out of oscillations for predetermined time periods in each operating cycle of the eccentric 46 proportional to the position of the vane 27 with respect to the coils 24 and 25.

As soon as vane 27 is moved between the coils 24 and 25 to a point which indicates a deviation from the control point, greater than minus one of Figure 3, variations in the coupling of the tube 35 will not be effective to change the effective critical point of the system and cause the oscillator to go into oscillation. Further, when the vane 27 has moved out from between the coils 24 and 25 by a predetermined amount, to plus one in Figure 3, so that the oscillator is oscillating, variations in the coupling through the tube 35 will not be effective to cause the oscillator to go out of oscillation. The range between the two extreme points between which the cyclically varying coupling effect of the tube 35 is effective is sometimes referred to as the proportioning band. This proportioning band may obviously be varied in many ways including the changing of the magnitude of the voltage applied to the slide wire 48 or changing the magnitude of the swing of the eccentric 46 when it moves the slider 47 over the slide wire 48.

It will also be obvious that the controlling action of the relay 63 may be reversed so that, instead of the switch blade 64 moving into engagement with the contact 65 when the vane 27 is between the vane coils 24 and 25, the blade 64 may be arranged to move out of engagement with the contact 65 by making the contact 65 an effective "out" contact or contact which is closed when the relay is deenergized. Further, if cyclic operation is not desired but the changing of the critical point is desired, the attenuation of the cathode follower may be varied by changing the bias voltage thereof and therefore the critical point of the oscillator.

While, in accordance with the provisions of the statutes, we have illustrated and described the best forms of embodiment of our invention known to us, it will be apparent to those skilled in the art that changes may be made in the forms of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. Control apparatus comprising, an electronic device having an output and an input, an oscillating circuit having a pair of tank circuits, one of which is operatively connected to said output circuit and the other of which is operatively connected to said input circuit, said oscillating circuit having a single inductive element common to said pair of tank circuits, a condition responsive element having a vane adapted to vary the effect of said inductive element on said oscillating circuit and cause said oscillating circuit to go into and out of oscillation in accordance with the relative position of said responsive element with respect to said inductive element, and an additional variable electrical coupling connected between said inductive element and said input to vary the coupling in said oscillating circuit.

2. Control apparatus comprising, an electron discharge device having an output and an input, an oscillating circuit having a pair of tank circuits, one of which is operatively connected to said output circuit and the other of which is operatively connected to said input circuit, said oscillating circuit having a single inductve element common to said pair of tank circuits, a condition responsive element having a vane adapted to vary the effect of said inductive element on said oscillating circuit and cause said oscillating circuit to go into and out of oscillation in accordance with the relative position of said vane with respect to said inductive element, and an additional variable electrical coupling connected in series with said inductive element to said input to vary the oscillating tendencies of said oscillating circuit.

3. Control apparatus comprising, an electron discharge device having an input and an output, an oscillating circuit having a pair of tank circuits, one of which is operatively connected to said output circuit and the other of which is operatively connected to an input circuit, said oscillating circuit having a single inductive element common to said pair of tank circuits, a condition responsive element having a vane adapted to vary the effect of said inductive element on said oscillatinig circuit and cause said oscillating circuit to go into and out of oscillation in accordance with the relative position of said vane with respect to said inductive element, a variable electrical coupling connected between said inductive element and said input to vary the coupling in said oscillating circuit, and continuously operating cyclically operative timing means connected to said variable electrical coupling to cyclically vary the effect of said coupling on said oscillating circuit.

4. Control apparatus, comprising, an electronic amplifying device having an input circuit and an output circuit, a pair of resonant circuits, one of which is connected to said output and the other of which is connected to said input and arranged to cause said device to oscillate when so connected, said pair having a variable inductive element connected to be common to both of said resonant circuits and to said input to adjust the oscillating point of said device, and a further variable electrical circuit for adjusting the oscillating point of said device, said last named circuit being connected in series with said variable inductive element to said input and introducing substantially zero signal phase shift between said inductive element and said input circuit of said device.

5. Control apparatus, comprising, an electronic amplifying device having an input circuit and an output circuit, a pair of resonant circuits having a variable inductive element common to both of said circuits, means connecting one of said pair to said output circuit and the other of said pair to said input circuit and when so connected effecting an oscillatory condition in said device in accordance with variations in said inductive element, and a variable feedback device connected in series with said variable inductive element, said variable feedback device further varying the oscillatory conditions in said device.

6. Control apparatus, comprising, an electronic amplifying device having an input circuit and an output circuit, a pair of resonant circuits having a variable inductive element common to both of said circuits, means connecting one of said pair to said output circuit and the other of said pair to said input circuit and when so connected effecting an oscillatory condition in said amplifying device, a variable feedback device connected in series with said variable inductive element, said feedback device further varying the oscillatory conditions of said device, and a continuously operated cyclically operating means arranged to control the variations of said feedback device.

7. Electrical apparatus comprising, an electrically resonant circuit, an electronic amplifying device connected to supply a signal to said circuit, a regenerative feedback connection between said circuit and said device to enable the establishing of an oscillatory condition in said apparatus, said feedback connection including a pair of independently variable impedance devices each of which produces impedance variations independently of the other, one of which is varied in accordance with the magnitude of a measured variable and the other of which is continuously varied in a cyclic manner.

8. In a control apparatus for a measured variable, the combination comprising, an electronic device, an electrically resonant circuit, means connecting said device in driving relation to said circuit, a regenerative oscillation producing connection between said circuit and said device, a pair of variable impedances connected in said connection, one of said impedances being varied in accordance with changes in the magnitude of a measured variable and the other being periodically varied so that oscillations will be present when the combined magnitude of said pair of impedances falls within predetermined limits, and control means responsive to changes in the current flow in said device arranged to affect the measured variable.

9. A controlled oscillator circuit for use in regulating the magnitude of a controllable variable comprising a first electronic amplifying means having a pair of output electrodes and a control element, means connecting said first amplifying means by way of said output electrodes to an output resonant circuit and to a separate feedback resonant circuit, a second electronic amplifying means having an input circuit which is coupled to said feedback circuit to present to said resonant feedback circuit a substantially fixed impedance whereby the loading effect of said input circuit on said resonant circuit is constant, said second amplifying means having an output circuit which is coupled to said control element to present an adjustable impedance to said control element, means included in said input circuit connected as a common circuit element between said feedback and output resonant circuits, and means connecting said output of said second amplifying means to the control element of said first amplifying means.

10. Apparatus as defined in claim 9 wherein said second electronic amplifying means comprises a cathode follower circuit with a connection from the control element of the first amplifying means to the output of the cathode follower circuit.

11. Apparatus as defined in claim 9 wherein said second electronic amplifying means comprises a continuously cyclically varying biasing voltage source connected to cyclically vary the effective impedance of said second amplifying means.

References Cited in the file of this patent

UNITED STATES PATENTS

| | | |
|---|---|---|
| 2,220,028 | Smith | Oct. 29, 1940 |
| 2,234,895 | Cerveny et al. | Mar. 11, 1941 |
| 2,300,996 | Vanderlyn et al. | Nov. 3, 1942 |
| 2,411,247 | Cohen | Nov. 19, 1946 |
| 2,440,486 | Rath | Apr. 27, 1948 |
| 2,505,577 | Rich | Apr. 25, 1950 |
| 2,531,313 | Wannamaker | Nov. 21, 1950 |
| 2,559,266 | Wannamaker | July 3, 1951 |
| 2,607,828 | Razek | Aug. 19, 1952 |